(12) United States Patent
Rose

(10) Patent No.: US 6,959,921 B2
(45) Date of Patent: Nov. 1, 2005

(54) TEMPERATURE RESPONSIVE VALVE ASSEMBLY FOR A PNEUMATIC SPRING

(75) Inventor: Mark M. Rose, Myrtle Beach, SC (US)

(73) Assignee: ArvinMeritor Technology, LLC, Troy, MI (US)

( * ) Notice: Subject to any disclaimer, the term of this patent is extended or adjusted under 35 U.S.C. 154(b) by 16 days.

(21) Appl. No.: 10/341,552

(22) Filed: Jan. 13, 2003

(65) Prior Publication Data

US 2004/0134729 A1  Jul. 15, 2004

(51) Int. Cl.[7] ................................................ F16F 9/02
(52) U.S. Cl. ................... 267/120; 267/64.12; 188/300
(58) Field of Search ............................... 188/276, 277, 188/300; 267/120

(56) References Cited

U.S. PATENT DOCUMENTS

| | | | |
|---|---|---|---|
| 3,804,326 A | * | 4/1974 | McIntire .................. 236/92 R |
| 3,857,373 A | * | 12/1974 | Martin et al. ............. 123/406.7 |
| 4,156,518 A | * | 5/1979 | Ludwig ........................ 251/11 |
| 4,408,751 A | | 10/1983 | Dodson et al. |
| 4,570,912 A | | 2/1986 | Dodson et al. |
| 4,705,059 A | * | 11/1987 | Lecerf et al. .................. 137/82 |
| 4,793,372 A | * | 12/1988 | Gauthier et al. .............. 137/82 |
| 5,628,496 A | | 5/1997 | Chamberlin |
| 6,425,279 B1 | | 7/2002 | Jeffries |

* cited by examiner

*Primary Examiner*—Chris Schwartz
(74) *Attorney, Agent, or Firm*—Carlson, Gaskey & Olds

(57) ABSTRACT

A temperature responsive valve assembly for a gas spring includes a valve body, a seal, a bi-metal valve and a locking member. The valve body includes a flexible radial member defined along the outer periphery of the valve body. Each radial member includes a radially inward extending tab which engages the outer diameter of the locking member. The construction allows the temperature responsive valve assembly to be essentially "snapped" together. The locking member further includes axial spring feet which provide axial pressure upon the bi-metal valve to maintain engagement with the valve seat.

14 Claims, 3 Drawing Sheets

TEMPERATURE RESPONSIVE VALVE ASSEMBLY FOR A PNEUMATIC SPRING

BACKGROUND OF THE INVENTION

The present invention relates to a damper assembly, and more particularly to a temperature responsive valve.

Biasing members known as pneumatic or gas springs, which for convenience can be referred to as counterbalance links, are becoming more common in commercial articles, particularly in the automotive industry, but they are being used in many other fields wherever the need is present to provide a counterbalance force for closure units, such as lids, doors and cabinet fronts, and gas spring replacement for mechanical spring fittings is becoming prevalent. In the automotive field, for example, pneumatic springs are used to assist in opening and supporting trunk lids and lift gates. In such applications, the counterbalance spring assemblies are compressed when the lid is closed, and they extend under differential pressure force acting on the piston when the lid is opened.

In some fields of use, such as automotive, the range of change of the surrounding temperature can be substantial. When the temperature drops, the pressure of the gas within the spring unit drops and concurrently therewith the force holding the piston rod extended or in the hold-open position must drop, and often drops below that required to hold the closure member in an open position. Conversely, at higher temperatures the force is often too high. To counter these disadvantages, pneumatic springs incorporate temperature compensation devices which compensate output force in response temperature changes.

One type of temperature compensation device includes output force modification through selective communication between one or more auxiliary gas chambers with the expansible piston chamber via a temperature responsive valve. The temperature responsive valve commonly includes bushing valves with bi-metal valve discs to provide an increase in gas volume only when the temperature falls below a predetermined value.

Although effective, conventional temperature compensation devices are relatively complex and complicated to manufacture resulting in a relatively expensive component.

Accordingly, it is desirable to provide a gas spring having temperature compensation devices which is effective yet uncomplicated and conducive to uncomplicated manufacture.

SUMMARY OF THE INVENTION

The gas spring assembly according to the present invention provides a temperature responsive valve assembly having a valve body, a seal, a bi-metal valve and a locking member. When temperatures are above a predetermined value, the bi-metal valve will be bowed into engagement with a valve seat and prevent gas flow from an auxiliary chamber into a first chamber. When the temperature value falls to the predetermined value, bi-metal valve will snap in the opposite bowed or concave condition away from engagement with the valve seat to permit fluid flow between the two adjacent chambers.

The valve body includes a flexible radial member defined along the outer periphery of the valve body. Each radial member includes a radially inward extending tab which engages the outer diameter of the locking member. That is, the radial members allows the temperature responsive valve assembly to be essentially "snapped" together. The locking member further includes axial spring feet which provide axial pressure upon the bi-metal valve to maintain engagement with the valve seat.

The temperature responsive valve assembly of the present invention provides greatly simplified assembly over conventional temperature responsive valves. Moreover, as all members other than the bimetal valve and seal are preferably of a non-metallic material, the temperature responsive valve assembly is relatively inexpensive to manufacture.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
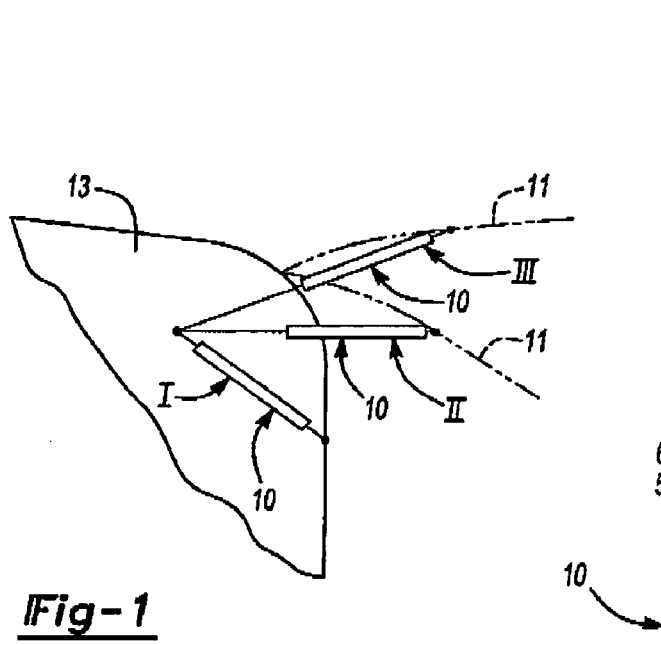
FIG. 1 is a diagrammatic view of a gas spring installed on a moveable closure member showing the three positions of the counterbalance.

FIG. 1 illustrates a schematic view of a gas spring assembly 10 designated as a counterbalance link. The gas spring assembly 10 is illustrated in various positions assumed between the compressed condition and an extended (expansion) condition when the counterbalance is installed on a moveable closure 11 of a vehicle 13 so as to control the pivoting movement of a closure member such as the hatchback, the lid of a luggage compartment, or the lid of the engine compartment. The gas spring may, of course, be used in many other applications.

Figure 2:
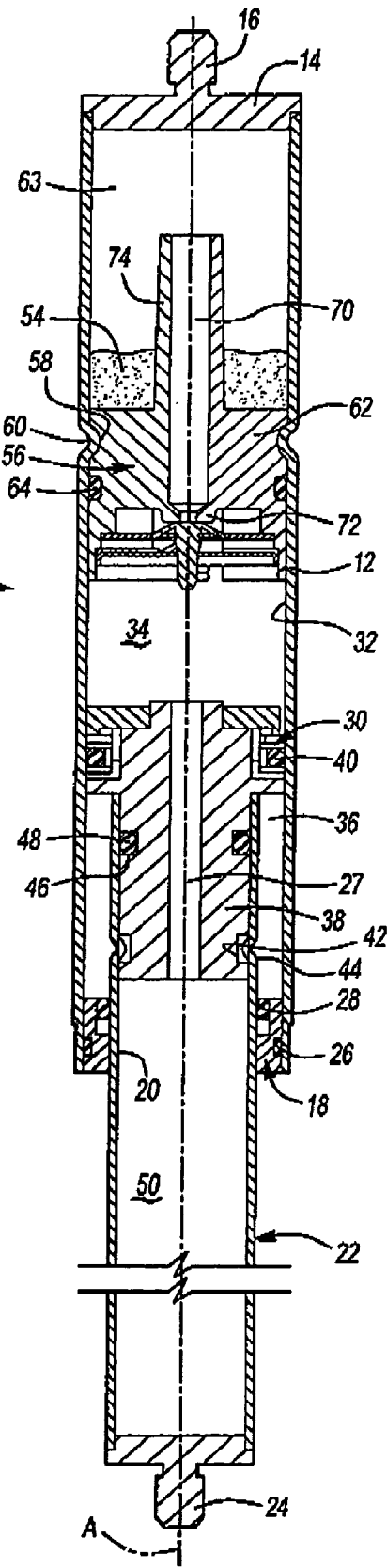
FIG. 2 is a longitudinal sectional view of a gas temperature spring and responsive valve assembly of the present invention.

Referring to FIG. 2, the main body 12 is preferably cylindrical. The body 12 has a closed end 14 on which is mounted an attachment fixture (illustrated schematically at 16). The opposite end of the main body 12 is closed off by an end plug 18 which defines an aperture 20 which allows linear passage of a hollow piston rod 22 along gas spring axis A. The piston rod 22 includes an attachment fixture (illustrated schematically at 24). It should be understood that various attachment fixtures such as fixed threaded connections and movable connections such as ball joints can be used with the present invention.

The end plug 18 includes a seal 26 between the end plug 18 and the body 12 and a seal 28 between the end plug 18 and the piston rod 22. The piston rod 22 slides through the aperture 20 without loss of a pressurized gas (e.g., air, nitrogen or some other inert gas) which is contained in both the body 12 and the piston rod 22. That is, the piston rod 22 provides a relatively large volume of gas which communicates between the body 12 and the piston rod 22 through an internal aperture 27. It should be understood that gas pistons having solid piston rods can be used with the present invention.

Within the body 12, the piston rod 22 is attached to a piston 30 which movably engages an inner wall 32 of the body 12 to separate the body 12 into a first chamber 34 and a second chamber 36. The piston 30 operates as a check valve and orifice by-pass structure to provide controlled by-pass flow of gas between chambers 34 and 36. There is a relatively free flow by-pass provided during the retraction or compression stroke and an "orifice" metered flow of gas past the piston during the extension or expansion stroke. It should be understood that piston 30 may include various well known porting, passageway and/or valve arrangements which provide for pressure transfer between chambers 34 and 36 as the piston rod 22 telescopes inward and outward relative to the body 12.

Preferably, the piston 30 is formed at least in part from a cylindrical plug 38 which forms aperture 27 and provides a rigid support for the piston rod 22 and a seal 40. Plug 38 includes a groove 42 such that piston rod 22 may be mounted to the plug 38 through a crimp 44 which engages the groove 42. A second groove 46 retains a seal 48 to assure a gas tight fit between the plug 38 and the piston rod 22. It should be understood that various plug and piston arrangements can be used with the present invention.

The first chamber 34 communicates with a piston rod chamber 50 of the piston rod 22 through the internal aperture 27. A relatively greater volume of gas may be contained within the gas spring 10 as compared to a conventional gas spring which includes a solid rod. That is, the first chamber 34 and the piston rod chamber 50 operate as a single relatively larger chamber through communication through the internal aperture 27. The second chamber 36 is sealed from the first chamber 34 and the piston rod chamber 50 of the piston rod 22 by the piston 30. Seals 26 and 40 assure that second chamber 36 is separated from the first chamber 34 and the piston rod chamber 50.

A temperature responsive valve assembly 56 is fixed in a predetermined location inside of the body 12 to selectively separate the first chamber 34 from an auxiliary chamber 63 containing an additional volume of gas. Preferably, the temperature responsive valve assembly 56 includes a groove 58 which mounts the temperature responsive valve assembly 56 within the body 12 through a crimp 60 which engages the groove 58.

As generally, known the temperature responsive valve assembly 56 defines the auxiliary chamber 63 which provides a selective increase in the volume of the first chamber 34 during predetermined temperature conditions in which the temperature responsive valve assembly 56 opens. Preferably, the temperature responsive valve assembly 56 opens at a predetermined temperature value of approximately 39 degrees F.

Figure 3:
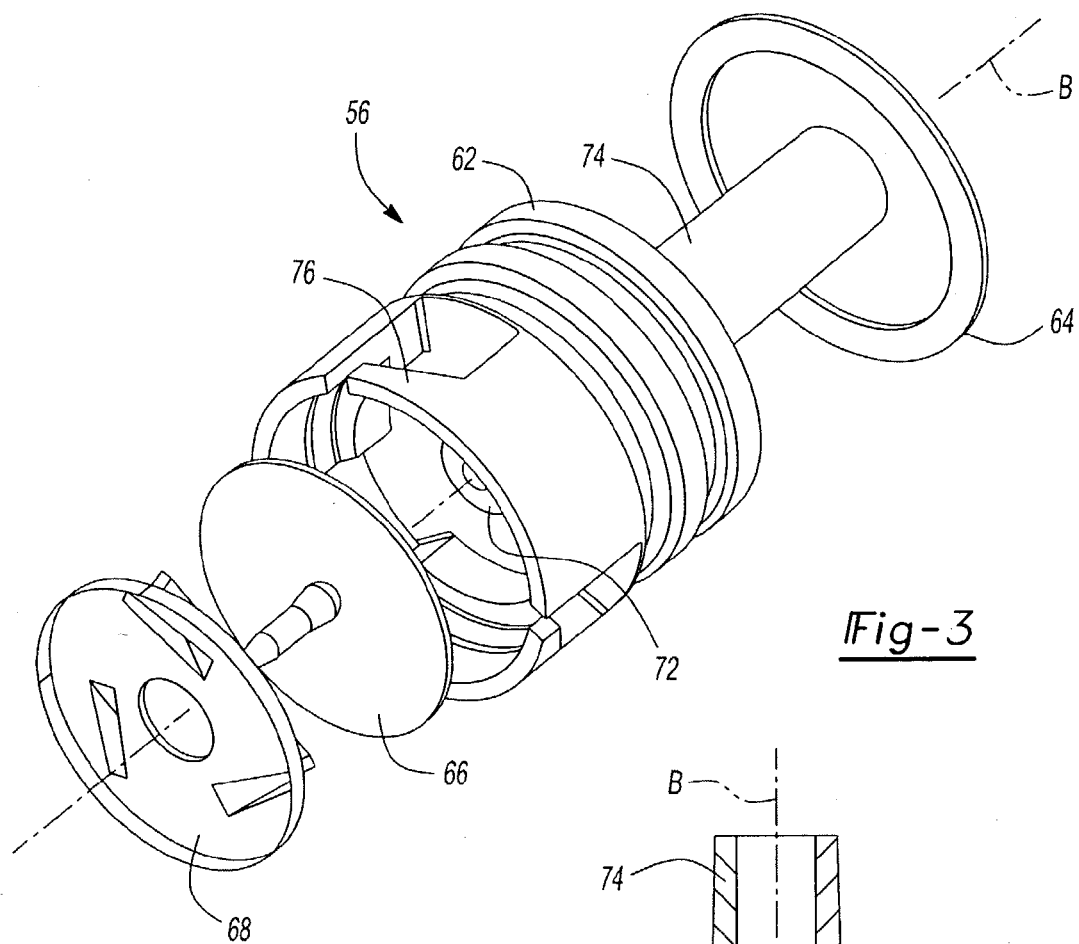
FIG. 3 is an exploded view of the temperature responsive valve assembly of the present invention.

Referring to FIG. 3, the temperature responsive valve assembly 56 includes a valve body 62, a seal 64, a bi-metal valve 66 and a locking member 68. The valve body 62 defines an axis B which corresponds with axis A when the temperature responsive valve assembly 56 is staked into the body 12 (FIG. 2). The seal 64 assures a gas tight fit when the temperature responsive valve assembly 56 is mounted within the body 12 (FIG. 2).

When temperatures are above a predetermined value, the bi-metal valve 66 will be bowed into engagement with a valve seat 72 (FIG. 4) and prevent gas flow from the auxiliary chamber 63 into the first chamber 34. That is, the bi-metal valve 66 or bi-metallic, temperature responsive disc will normally be shaped with a convex surface engaging the valve seat 72 to provide the valve closure. When the temperature value falls to the predetermined value, bi-metal valve 66 will snap in the opposite bowed or concave condition away from engagement with the valve seat 72 to permit fluid flow between the two adjacent chambers 63, 34 (FIG. 2), i.e., the effective volume of the spring 10 is increased at the lower temperature.

Figure 4:
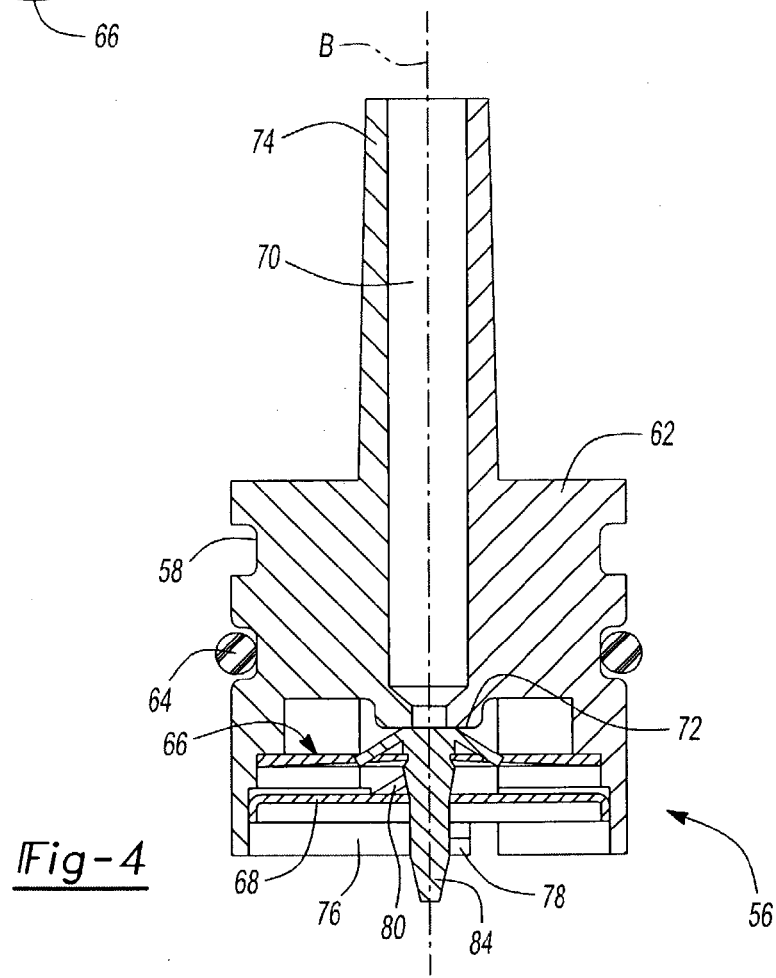
FIG. 4 is an enlarged cross-section along the axis of the bimetallic disc temperature compensating bushing assembly which is a subcomponent of the structure shown in FIG. 2.

The valve body 62 defines a longitudinal passageway 70 (FIG. 2) in communication with the valve seat 72 which is closed through engagement of the bimetal valve 66 therewith (FIG. 4). The valve body 62 further includes a longitudinally hollow stinger 74 The stinger 74 extends along the gas spring axis A to prevent a liquid oil 54 contained within the auxiliary chamber 63 from entering the first chamber 34 when the piston rod 22 is rotated to an upward position (rotated 180 degrees from that illustrated in FIG. 2). That is, as the spring 10 tilts back and forth during operation, the oil will run along the wall but can never enter the extended end of the stinger 74.

Figure 5:
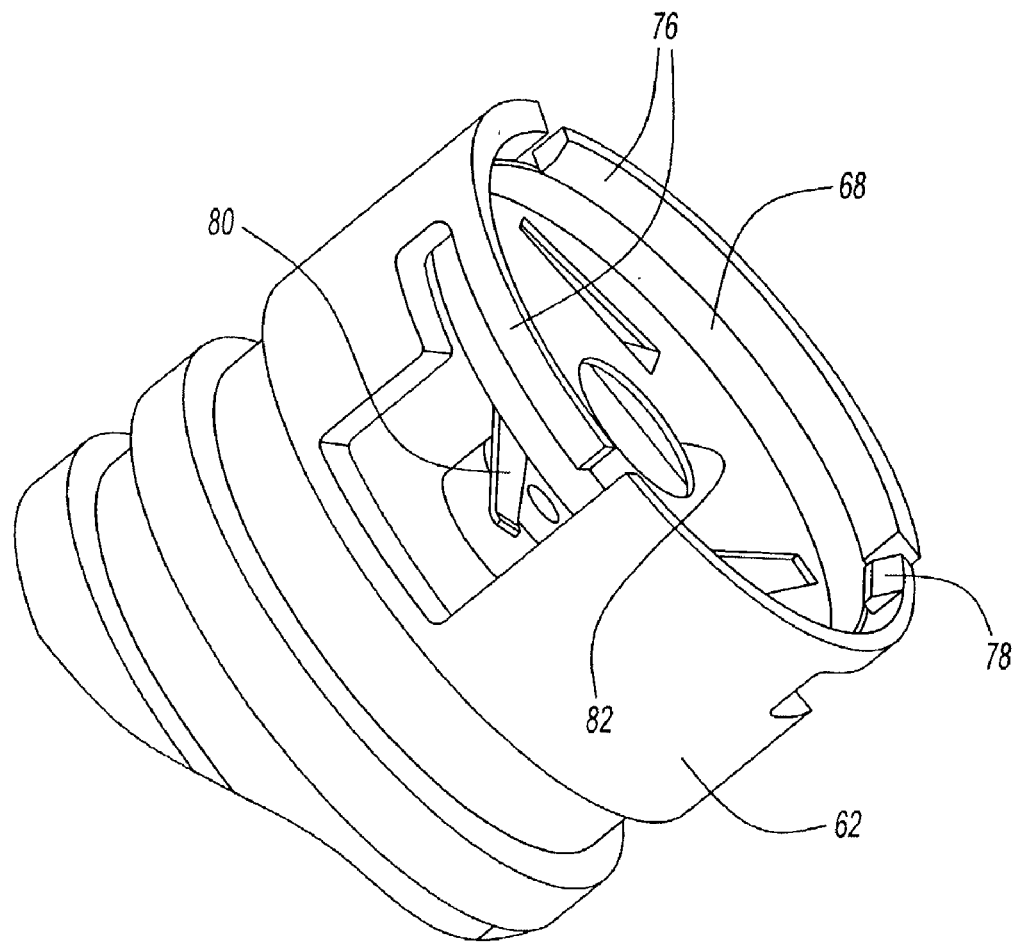
FIG. 5 is a perspective view of the temperature responsive valve assembly.

The valve body 62 further includes a flexible radial member 76 (also illustrated in FIG. 5; three being used in the illustrated embodiment). Each radial member 76 is defined along the outer periphery of the valve body 62 such that each will flex radially outward. Each radial member 76 includes a radially inward extending tab 78 which engage the outer diameter of the locking member 68 (FIG. 5). That is, the bi-metal valve 66 is located within the valve body 62 adjacent the valve seat 72 followed by the locking member 68. The locking member 68 flexes the radial members 76 radially outward until the locking member 68 is seated and then flex back to their original condition to lock the locking member 68 in place with the tabs 78. The radial members 76 allows the temperature responsive valve assembly 56 to be essentially "snapped" together.

The locking member 68 further includes axial spring feet 80 (also illustrated in FIG. 5; three being used in the illustrated embodiment) which provide axial pressure upon the bi-metal valve 66 to maintain engagement with the valve seat 72. An axial aperture 82 within the locking member 68 receives an axial extension 84 from the bi-metal valve 66 to further maintain alignment of the bi-metal valve 66 with the valve seat 72 when the bi-metal valve 66 snaps open and closed.

The aforedescribed construction of the temperature responsive valve assembly 56 provides greatly simplified assembly over conventional the temperature responsive valves. Moreover, as all members other than the bimetal valve and seal are preferably of a non-metallic material, the temperature responsive valve assembly 56 is relatively to manufacture.

In this temperature compensated pneumatic spring, the additional volume of gas which is utilized at lower temperature, in accordance with the described structure, is provided by increasing the length of the cylinder body 12 but not the length of the piston stroke. As well understood in the pneumatic spring counterbalance art, the dimensional values of the extended and retracted linkage, the diameters of the cylinder, piston and rod, and the pressure value of the gas within the specific spring will be dictated by the specific job for which the link is intended and will be so designed. Using higher gas pressures and different kinematics of linkage installation, the spring link can be designed for longer or shorter lengths for specific installations.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A temperature responsive valve assembly for a pneumatic spring, comprising:
   a valve body defining a longitudinal axis along a longitudinal passageway, said valve body comprising a plurality of flexible radial members;
   a bi-metal valve selectively engageable with a valve seat in communication with said longitudinal passageway; and
   a locking member which engages said valve body and said bi-metal valve, said plurality of flexible radial members engageable with said locking member, said locking member including a multitude of axial spring feet which provide axial pressure along said longitudinal axis upon said bi-metal valve.

2. The temperature responsive valve assembly as recited in claim 1, wherein each of said plurality of flexible radial members comprise a tab engageable with said locking member.

3. The temperature responsive valve assembly as recited in claim 1, wherein said valve body comprises a stinger about said longitudinal passageway.

4. The temperature responsive valve assembly as recited in claim 1, further comprising an axial aperture within said locking member to receive an axial extension extending from said bi-metal valve, said axial extension from said bi-metal valve defined along said longitudinal axis.

5. The temperature responsive valve assembly as recited in claim 1, wherein said multitude of axial spring feet are non-metallic.

6. A pneumatic spring, comprising:
   a pneumatic spring main body;
   a valve body defining a longitudinal axis, said valve body comprising a plurality of flexible radial members, said pneumatic spring main body attached to said valve body;
   a bi-metal valve; and
   a locking member which engages said valve body and said bi-metal valve, said plurality of flexible radial members engageable with said locking member, said locking member including a multitude of axial spring feet which provide axial pressure along said longitudinal axis upon said bi-metal valve.

7. The pneumatic spring as recited in claim 6, further comprising an axial aperture within said locking member to receive an axial extension extending from said bi-metal valve, said axial extension from said bi-metal valve defined along said longitudinal axis.

8. The pneumatic spring as recited in claim 6, wherein said multitude of axial spring feet are non-metallic.

9. A pneumatic spring, comprising:
   a pneumatic spring main body;
   a piston rod defined along a longitudinal axis, said piston rod attached to a piston which movably engages an inner wall of said pneumatic spring main body to separate said pneumatic spring main body into a first chamber and a second chamber;
   a temperature responsive valve assembly which comprises:
   a valve body defining along said longitudinal axis, said valve body attachable to said pneumatic spring main body said valve body includes a plurality of flexible radial members to engage said locking member;
   a bi-metal valve; and
   a locking member which engages said valve body and said bi-metal valve, said locking member providing axial pressure upon said bi-metal valve along said longitudinal axis.

10. The pneumatic spring as recited in claim 9, wherein said temperature responsive valve assembly selectively separates said first chamber from an auxiliary chamber containing a volume of gas.

11. The pneumatic spring as recited in claim 9, wherein said valve body comprises an axially extending hollow stinger which extends into said auxiliary chamber.

12. The pneumatic spring as recited in claim 9, further comprising an axial aperture within said locking member to receive an axial extension extending from said bi-metal valve, said axial extension defined along said longitudinal axis.

13. The pneumatic spring as recited in claim 9, wherein said valve body includes a groove transverse to said longitudinal axis, said pneumatic spring main body crimped within said groove to retain said valve body within said pneumatic spring main body.

14. The pneumatic spring as recited in claim 9, wherein said locking member include a multitude of non-metallic axial spring feet which provide said axial pressure upon said bi-metal valve along said longitudinal axis.

* * * * *